(12) United States Patent
Boselli et al.

(10) Patent No.: US 10,189,127 B2
(45) Date of Patent: Jan. 29, 2019

(54) POSITIONING OF A SPINDLE WITH MICROMETRIC FORWARDING CONTROL AND TILTING OF ITS ROTATION AXIS

(71) Applicant: Tenova S.p.A., Milan (IT)

(72) Inventors: Giovanni Boselli, Magenta (IT); Davide Manenti, Sondrio (IT); Massimo Perassolo, Grandona (IT); Donato Ricciardi, Sesto San Giovanni (IT)

(*) Notice: Subject to any disclaimer, the term of this patent is extended or adjusted under 35 U.S.C. 154(b) by 0 days.

(21) Appl. No.: 15/549,518

(22) PCT Filed: Feb. 3, 2016

(86) PCT No.: PCT/EP2016/000168
§ 371 (c)(1),
(2) Date: Aug. 8, 2017

(87) PCT Pub. No.: WO2016/131524
PCT Pub. Date: Aug. 25, 2016

(65) Prior Publication Data
US 2018/0021901 A1    Jan. 25, 2018

(30) Foreign Application Priority Data

Feb. 18, 2015  (IT) .............................. MI2015A0230

(51) Int. Cl.
| | |
|---|---|
| *B23Q 3/18* | (2006.01) |
| *B23B 19/02* | (2006.01) |
| *B23Q 1/32* | (2006.01) |
| *B24B 41/04* | (2006.01) |
| *B23Q 1/52* | (2006.01) |
| *B23Q 1/70* | (2006.01) |

(52) U.S. Cl.
CPC ................. *B23Q 1/32* (2013.01); *B23Q 1/52* (2013.01); *B23Q 1/525* (2013.01); *B23Q 1/70* (2013.01); *B23Q 3/18* (2013.01); *B24B 41/04* (2013.01)

(58) Field of Classification Search
CPC ... B23Q 5/04; B23Q 5/06; B23Q 5/08; B23Q 5/10; B23Q 1/70; B23Q 1/54; B23Q 3/18; B23Q 23/00
See application file for complete search history.

(56) References Cited

U.S. PATENT DOCUMENTS 2,773,968 A    12/1956  Martellotti
3,584,534 A *   6/1971  Hougen .............. B23B 51/0018
                                                    409/191

(Continued)

FOREIGN PATENT DOCUMENTS

DE   102008031817    12/2009
WO     2012126840     9/2012

*Primary Examiner* — Nicole N Ramos
(74) *Attorney, Agent, or Firm* — Themis Law

(57) ABSTRACT

A positioning of a spindle with micrometric forwarding control and tilting of its rotation axis includes a spindle shaft rotatingly supported inside rotatable supports, wherein the rotatable supports include two spherical elements having housings which are eccentric with respect to the rotation axis that join the centers of the spheres, and wherein the two spherical elements are positioned in a cylindrical housing having at least two parts, and wherein two rotation elements are connected to the two spherical elements and cause their independent rotation.

15 Claims, 20 Drawing Sheets

(56) References Cited

U.S. PATENT DOCUMENTS

| | | | | |
|---|---|---|---|---|
| 4,634,322 A | * | 1/1987 | Walker | B23C 3/12 |
| | | | | 409/138 |
| 6,234,885 B1 | | 5/2001 | Haferkorn | |
| 2013/0255454 A1 | * | 10/2013 | Yamamoto | B23Q 1/5406 |
| | | | | 82/146 |

* cited by examiner

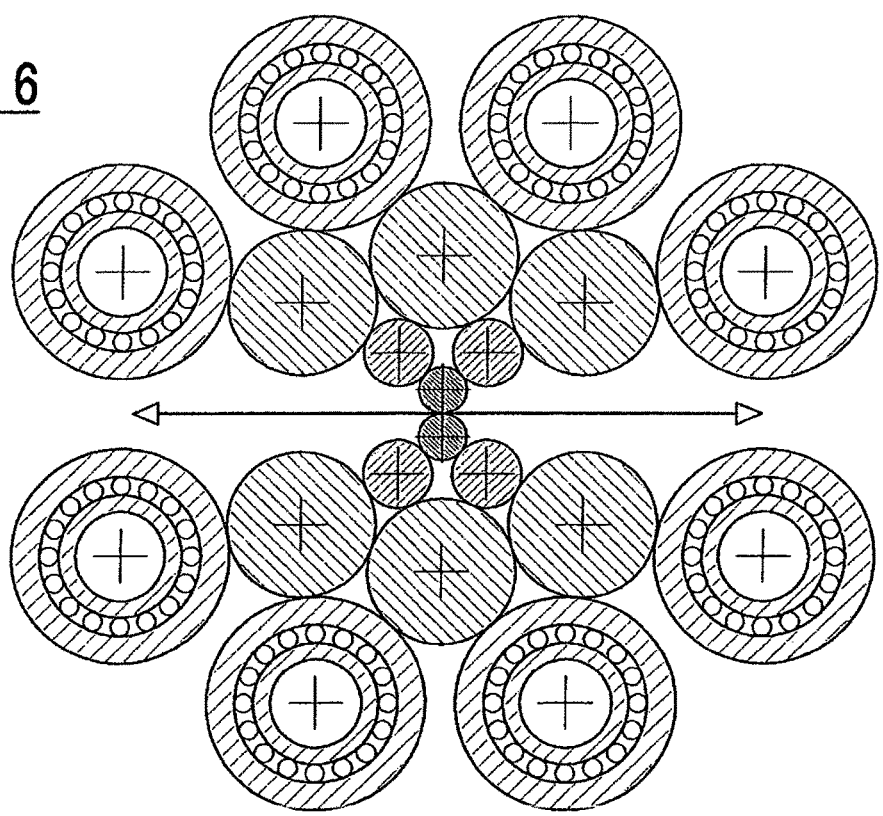
Fig. 6
a
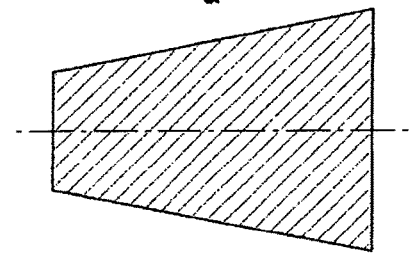
b
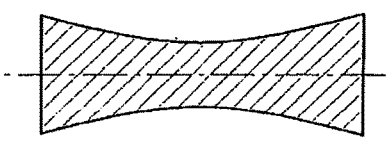
c
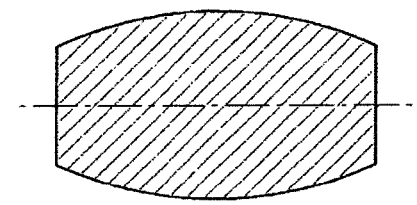
Fig. 7
d
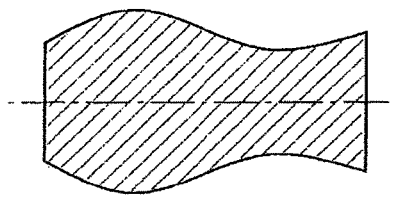

Fig. 13
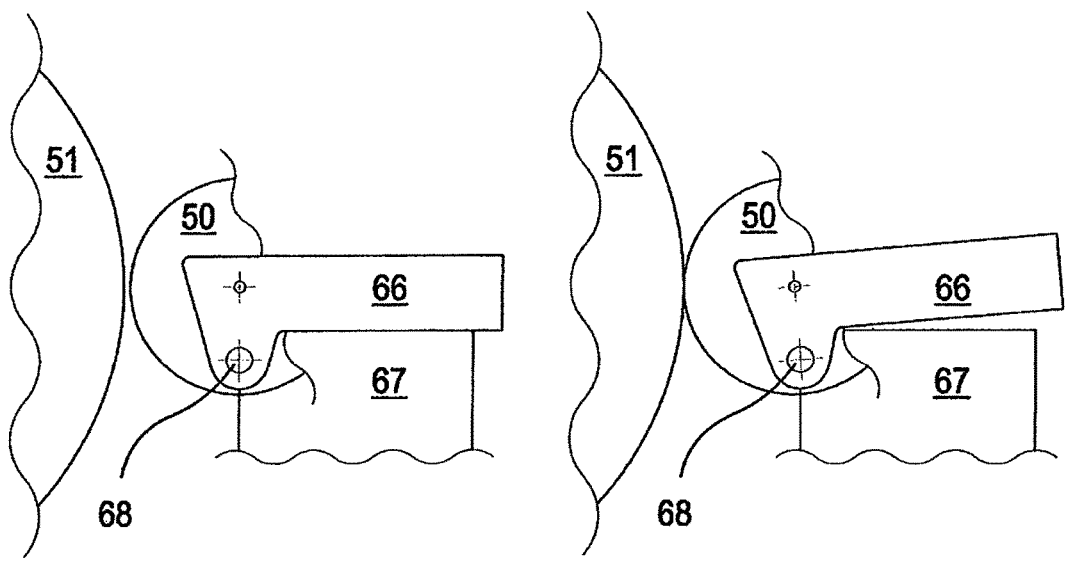
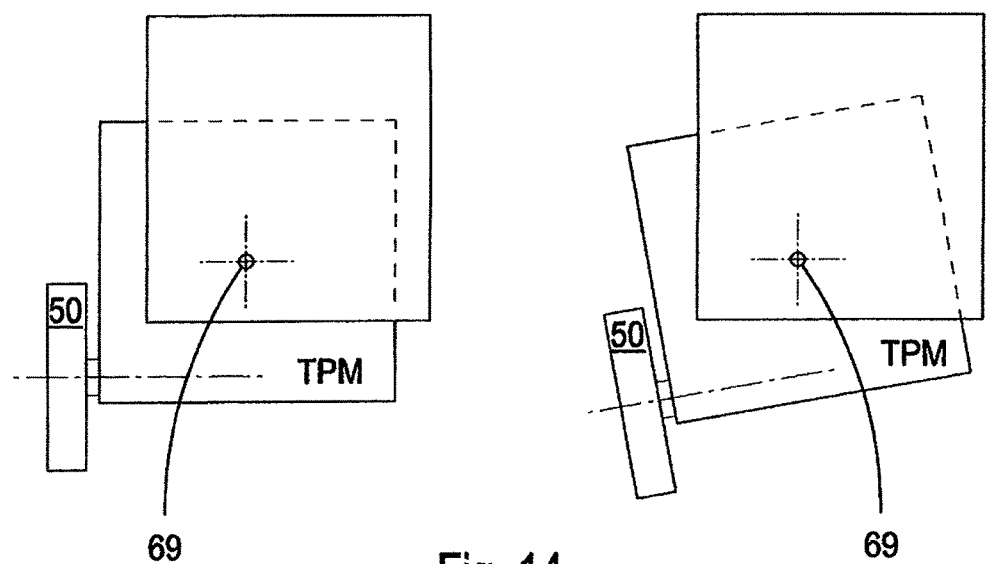
Fig. 14

Fig. 15
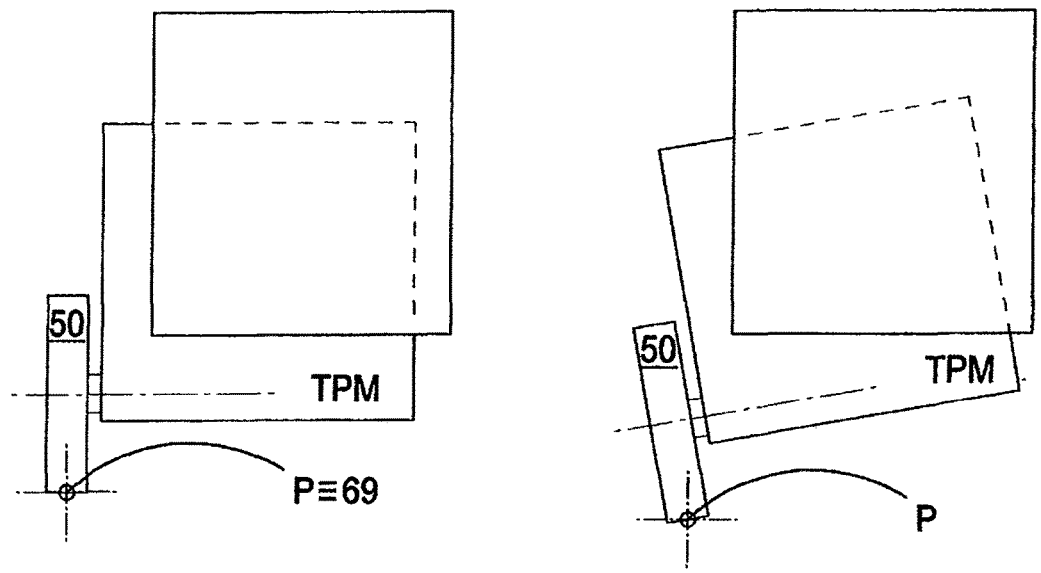
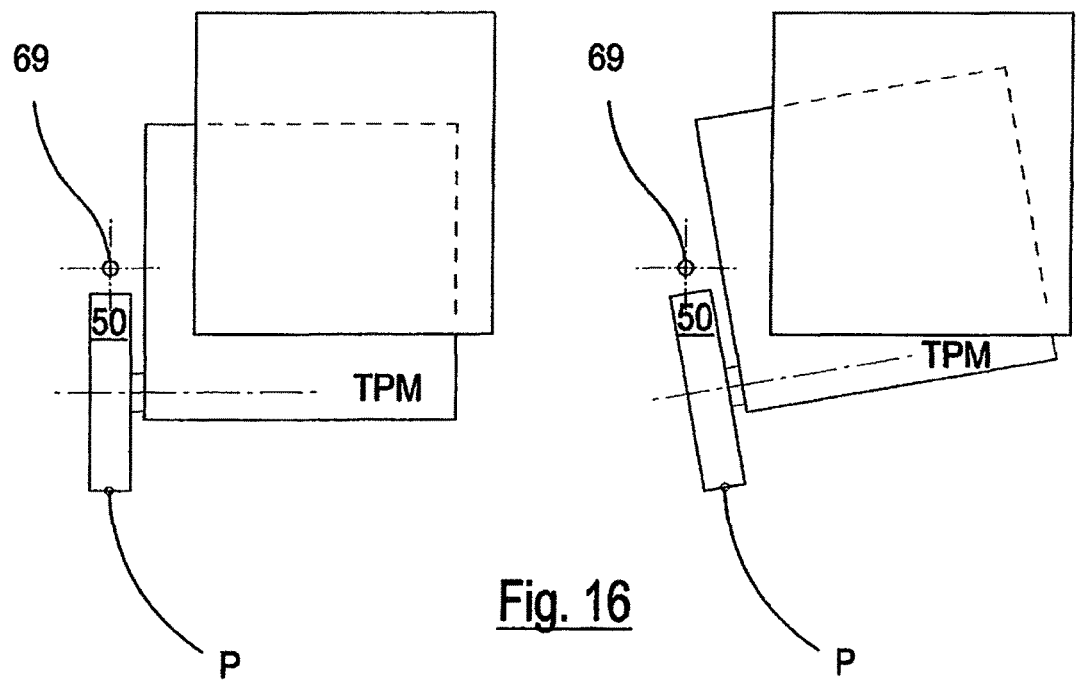
Fig. 16

POSITIONING OF A SPINDLE WITH MICROMETRIC FORWARDING CONTROL AND TILTING OF ITS ROTATION AXIS

The present invention relates to a positioning of a spindle with micrometric forwarding control and tilting of its rotation axis in the plane perpendicular to the working plane.

In order to make the present description as clear as possible, reference will be made hereunder to applications of this spindle in the grinding field, without limitation, however, with respect to possible applications in other fields. For a better understanding of the field of the invention, the following should be specified.

It is well-known that grinding consists of a mechanical processing for removing chippings, generally used for obtaining high-precision end-products with respect to both geometric and dimensional tolerances and also with respect to the roughness of the surface processed.

Machines that effect this type of processing are called grinding machines and can have various configurations depending on the specific application in which they are used (processing precision, dimension and shape of the piece being processed, required productivity, working environment, etc.).

FIG. 1 schematically illustrates the grinding process in which a tool 50 (in particular a grinding wheel), represented as a cylinder (it can actually have various geometrical configurations, for example, truncated-conical, or a revolution solid having the profile with the form to be obtained). This tool 50 comprises granules of an abrasive (diamond, silicon carbide, aluminium oxides, etc.) that are immersed in a suitable binding matrix (plastic, metallic or resinous). A more evolved form of this tool is represented by the use of the so-called CBN technology; in this configuration, a layer of cubic boron nitride (CBN), relatively thin, is applied to a support made of materials such as aluminium, carbon fibre, etc. having supporting and structural functions.

This tool 50 is rotated in contact with a piece to be processed 51, in the presence of a cooling lubricant fluid 52, and in a parallel translation motion with respect to the surface to be processed, according to the arrow 53. In this way, the tool 50 removes a certain thickness in excess, producing scraps 54 of the piece to be processed 51, until the required size and geometry of said tool is obtained.

Having said this, the applications of the grinding process can be divided, for example, into two main categories:
  grinding of flat surfaces (effected by so-called tangential grinding machines)
  grinding of circular products (effected by grinding machines for circular components).

The field of interest in this context is the second category and, in particular, even if there are no specific limitations, it relates to the grinding of cylinders for rolling mills of flat metallic products.

It should be remembered in this respect that rolling mills for flat metallic products are plants whose purpose is to reduce the thickness of a slab of metal to the desired value and, in some cases, to confer certain surface and structural characteristics to the final product.

It is also known that there is a wide variety of rolling mills, which are used according to the production requirements, the surface quality and structural characteristics to be conferred to the rolled product.

The main types of rolling mills are the following:
  A—Rolling mill called "duo" (2-High mill), as represented in FIG. 2;
  B—Rolling mill called "fourth" (4-High mill), as represented in FIG. 3;
  C—Rolling mill called "sixth" (6-High mill), as represented in FIG. 4;
  D—Rolling mill called "Z-High" as represented in FIG. 5;
  E—Rolling mill called "20-High" as represented in FIG. 6.

In the various exemplifications shown, it can be seen that the cylinders can have a wide variety of forms and dimensions. The dimensions, in fact, range from a few tenths of mm in diameter and about 1 m in length in the case of "Z-High" or "20-High" applications, up to about 2,000 mm in diameter and lengths of over 8 m in "Heavy plate" applications, not shown in the above-mentioned figures.

What is important for the topic in question, however, is that, regardless of their application, these cylinders rarely have a straight generatrix, as this is, in most cases, a curve.

The cylinders therefore generally have conical (a), rounded concave (b), rounded convex (c) or sinusoidal (d) profiles, as represented for purely illustrative but non-limiting purposes, in the above-mentioned schemes of FIG. 7.

In addition, this profile can sometimes be defined by a polynomial of a relatively high degree, or it can be represented in numerical form by means of a table of coordinates.

Considering now, as reference, a cylinder having any non-straight profile as schematized in FIG. 8, the main problem relating to the production of these profiles by means of the grinding process can be seen.

In order to operate optimally, a grinding wheel 50 should ideally follow the profile of the piece being processed 51 in terms of both contact point P (which should always be in correspondence with the intersection point between the midplane of the grinding wheel and the generatrix of the cylinder), and also in terms of contact angle $\alpha$ (angle of the profile), ensuring that the tangent of the generatrix angle of the grinding wheel is always equal to the first derivative of the curve of the profile (profile angle) along the whole longitudinal development of the profile itself, as represented in various positions of the grinding wheel 50 in FIG. 8.

If the angle $\alpha$ of the grinding wheel 50 cannot be modified, so as to make it equal to that of the profile, the grinding wheel 50 will operate anomalously. In particular, a gouging phenomenon will arise, which occurs when the grinding wheel 50 approaches the surface of the piece 51 edgewise, reducing the grinding wheel-cylinder contact area, increasing the processing times and, in general, causing a deterioration in the end-quality of the surface of the cylinder.

Considering the grinding-wheel centre P as reference point for controlling the position of the grinding wheel 50, in fact, operating in a gouging condition leads to the production of a real profile 55 which is different from an ideal profile 57, indicated in dashed lines in FIG. 9.

Consequently, not only do the non-homogeneities in terms of surface roughness become more marked, but, without adequate error compensations, it is difficult to guarantee the correct formation of the required profile of the cylinder. This occurs as the edge 56 of the grinding wheel 50 moves the real operating point, removing a different quantity of material and varying the final geometry of the piece, as illustrated in FIG. 9.

It can also be easily understood that the greater the length of the grinding wheel 50, the more marked the gouging phenomenon will be and, as, in order to improve the productivity of the grinding process, there is the tendency to increase this dimension, machines that are not equipped with a suitable device which allows the grinding wheel to be always parallel to the profile of the cylinder, consequently have difficulty in obtaining the desired and required profile, for the reason described above.

Furthermore, in order to have an even better understanding of the technical problems at the basis of the invention and having a better overall view of the state of the art so far known, it would be useful to introduce some further concepts concerning the grinding field for rolling-mill cylinders, describing the main elements of a grinding machine for cylinders, peripheral and fixed for the outside, as represented in FIG. 10.

A cylinder 51 being processed is caused to rotate by the workhead and is sustained on a base 58 by means of suitable hydrostatic or more commonly hydrodynamic supports 59, called lunettes, or, in the case of relatively small cylinders or during the manufacturing process of the cylinders, they can be supported directly between the headstock and tailstock of the machine.

The grinding wheel 50 is fixed to the end of a spindle, the latter being assembled in a suitable seat formed on the so-called wheelhead (TPM) in turn moved in a perpendicular direction (axis X) with respect to the rotation axis of the cylinder on the wheelhead trolley which, on the contrary, moves along the longitudinal development of the base (axis Z). Finally, as better described hereunder, the TPM can have, according to necessity, two further degrees of freedom. The first is commonly called axis U (micrometric forwarding of the grinding-wheel centre in the direction X). The axis U has the purpose of allowing a forwarding of either the spindle alone (solution with "eccentric spindle", better described hereunder) or of a part of the TPM (solution called "tilt infeed" better described hereunder) so as to guarantee the best possible accuracy in following the profile of the cylinder 51, which, in certain applications, cannot be fully guaranteed by the movement of the axis X alone. The second, commonly called "Axis B", is represented by the rotation of the grinding wheel around a vertical axis, perpendicular to the axis of the cylinder.

Consequently, as described, in order to have a perfect relative positioning between the grinding wheel 50 and the cylinder 51, three fundamental axes are necessary, X, U and B, whereas the movement of the spindle-TPM together to effect the profile of the cylinder in its entire length is entrusted to the axis Z. For a series of reasons, the axes X, U and B, however, are not all present in the various construction solutions.

The market in fact proposes various solutions as described hereunder.

1) A first solution is that in which the positioning is obtained using the axis X alone, or with a single degree of freedom.

In this case, the axes U and B are not envisaged and the position of the grinding wheel is regulated only by means of the axis X which, through a linear movement system (often consisting of a motor or gearmotor coupled with a recirculating ball screw, or a linear motor) fixed to the wheelhead trolley, allows the approach or withdrawal of the whole TPM with respect to the cylinder 51 being processed (FIG. 11).

The advantages of this solution are:
simple and inexpensive construction;
reduced maintenance; and
high static rigidity of the TPM.

There are also disadvantages, however, such as:
the axis X, responsible for the positioning of the grinding wheel 50 must also move the entire TPM, i.e. the support of the spindle itself. This means that there is difficulty in the control and accuracy of the system: the movement of the grinding wheel must be effected in small steps, so as to follow the profile of the cylinder as accurately as possible. The greater the mass to be moved, the more difficult it will be to control these steps;

the possible application of reduction steps for moving the axis X if, on the one hand, it allows the transmission ratio to be increased, therefore improving the resolution, on the other, it entails a deterioration in the total rigidity of the axis with a consequent loss of accuracy of the positioning system;

impossibility of following the angle variations of the profile of the piece due to the axis of the fixed spindle 60, which, in fact, compels the grinding wheel 50 to operate edgewise, causing a series of problems extensively described above.

2) A second solution is that in which the grinding wheel is positioned in a perpendicular position with respect to the cylinder axis according to an axis X and an axis U, i.e. with two degrees of freedom.

In addition to the axis X, whose construction form remains unaltered with respect to what has been described for the first solution, on this type of TPM, the presence of the axis U is envisaged. This axis has a high resolution which moves by certain degrees along the direction of the same axis X, but without using the latter. Various construction forms have been proposed for this solution of which the main ones are described hereunder.

In a first proposal (represented in FIG. 12), a spindle 61 rotates around one of its axes 65 in an appropriate eccentric bushing 62 which, in turn, can rotate around one of its axes 63 in a housing 64 envisaged inside the TPM.

By rotating the eccentric, for example by means of a suitable lever system (not shown), the distance of the grinding wheel 50 with respect to the cylinder 51 can be varied. The transmission ratio of this command can be as large as desired and the possibilities of regulating and controlling the system are therefore improved, the masses involved are reduced and the capacity of the dynamic response of the system is increased. Solutions such as those described above are defined as "eccentric spindles".

A second proposal (represented in FIG. 13) consists in envisaging a further division of the TPM with respect to what is described in FIG. 11. An upper part 66 of the TPM is separated from a lower part 67 (which is called underbase) on the trolley, in which the movement system of the TPM (axis X), is always present. The upper part 66 is hinged to the lower part 67 by means of a pin 68 with a horizontal axis parallel to the cylinder axis. A suitable movement system positioned between the TPM and the underbase allows a relative rotation of the upper part 66 with respect to the lower part 67, thus varying the distance of the grinding wheel 50 from the cylinder 51. This mechanism is commonly defined as "Tilt infeed".

With respect to the first solution of FIG. 11, the improvements described above allow the masses in movement to be limited, improving the prompt response of the system and its positioning accuracy.

It can be easily understood that advantages can be obtained such as the high resolution of the movement of the grinding wheel in producing the profiles.

Some disadvantages, however, are present, such as:
construction complication;
increased maintenance;
loss of static rigidity;
the problem of not producing strictly cylindrical profiles has not yet been solved in fact, as for the solution of FIGS. 11 and 12, the grinding wheel 50 continues to operate by gouging the surface of the piece with all the problems previously discussed.

3) A third solution is that in which there is the positioning according to an axis X, an axis U and an axis B, i.e. with three degrees of freedom.

This solution allows the grinding wheel 50 to be always tangent to the profile of the piece, obviously in addition to guaranteeing micrometric forwarding. The rotation of the grinding wheel 50 around a vertical axis (whose control is commonly defined as axis B) is obtained by rotating the whole TPM (and the underbase, in the case of mechanisms with a micrometric forwarding according to the "tilt infeed" scheme) around a vertical axis 69. Said axis can be positioned in any point (FIG. 14), but it can be easily proved that the mechanism is optimized if it is positioned in correspondence with the contact point P of the grinding wheel 50 with the cylinder 51 (FIG. 15). Now, as this point or rotation centre 69 can be moved in a direction X due to the wear of the grinding wheel, it is in fact preferable to position it, also for practical reasons, in correspondence with the midplane of the grinding wheel 50 and behind the grinding wheel itself (FIG. 16).

An immediate advantage is that this solution is conceptually easy and reliable.

There are however some disadvantages such as:
construction complication;
high costs;
increased maintenance.

An interesting evolution of this mechanism can be obtained by observing the functioning principle of the "tilt infeed" mechanism. If, in fact, the rotation axis 68 of the TPM is tilted with respect to the underbase 67 as in FIG. 17, by causing it to rotate in the vertical plane by a certain angle, it can be easily seen that, when the control of the axis U is actuated, a micrometric increase is obtained in the direction X as in the classical case and, in addition, also a slight rotation of the grinding wheel around a vertical axis.

It can also be immediately seen that the efficiency of the mechanism increases, the closer the intersection point of the spindle and the tilted rotation axis of the TPM moves towards the intersection point between the midplane of the grinding wheel and the same axis of the spindle, proving to be maximum when these two points coincide.

It is specifically this consideration that led to the solution proposed in U.S. Pat. No. 6,234,885 B1.

According to this known solution, represented in FIG. 18 enclosed herewith, which indicates the reference numbers of the same patent, the spindle 7 is housed inside a first cylindrical bushing 19', but in which the seat of the spindle is eccentric with respect to the axis of the bushing itself. In this way, by rotating said eccentric bushing 19' with a suitable command (axis U previously indicated), the micrometric forwarding is obtained as mentioned in the previous cases. At this point, if said eccentric, instead of being housed directly in the TPM, is housed in a cylindrical bushing 108, whose axis 9 is tilted by a certain angle with respect to the horizontal plane, by rotating the latter, the desired rotation of the grinding wheel axis around a vertical axis, is obtained. The grinding wheel 4 in fact, also rotates by a small angle around a horizontal axis (parallel to the axis X), but this does not influence the technological grinding process.

As the main advantage, this is an extremely compact solution.

It cannot be denied, however, that there are a series of disadvantages as described hereunder:

the structural asymmetry, due to the presence of housings tilted with respect to each other, can cause problems of thermal expansion of the components and errors in controlling the correct positioning of the working point of the grinding wheel.

the high mass represented by the bushings 19' and 108 of FIG. 18, makes the couplings critical, as their non-conformity leads to the introduction of low-value frequencies that can have a negative influence in the field of processing frequencies typical of grinding, with a consequent increase in undesired vibrations and a reduction in the surface quality;

the unit envisages the presence of three pairs of radial bearings, more specifically indicated with:
21 for the spindle 7,
20 for the eccentric bushing 19' (Axis U),
20 for the tilted bushing 108 (Axis B).

As all of these devices must find housing in a limited space (a TPM that is too large limits the practical use of the machine), the spindle 7 must be relatively small and therefore have a limited intrinsic rigidity.

Finally, the above-mentioned bearings must also contribute to a general loss in rigidity of the system.

A general objective of the present invention is to solve the problems indicated above.

In particular, an objective of the present invention is to provide a positioning that is such as to guarantee maximum performances of the grinding process for cylinders for rolling mills.

In order to achieve this objective, as can be clearly seen, the grinding wheel should be able to follow the profile of the cylinder always remaining tangent to it, so as to avoid the danger of gouging.

A further objective of the present invention is to find a positioning that, on the one hand, can guarantee the requisites mentioned above and, on the other hand, to obtain this result with a simple, compact mechanism with a high static and dynamic rigidity and with easy maintenance.

In view of the above objectives, according to the present invention, a positioning has been conceived, having the characteristics specified in the enclosed claims.

The structural and functional characteristics of the present invention and its advantages with respect to the known art will appear even more evident from the following description, referring to the enclosed schematic drawings, which, in addition to elements and characteristics of the known art, also show an embodiment of the invention. In the drawings:

FIGS. 2 to 6 show various types of sections of rolling mills using different rolling cylinders;

FIG. 7 shows rolling cylinders having different surface profiles;

FIG. 13 is a schematic detail of a second known solution in which there is the micrometric positioning of the grinding wheel with two degrees of freedom;

FIG. 14 is a schematic view of a known solution in which there is the micrometric positioning of the grinding wheel with an axis X, an axis U and an axis B, i.e. with three degrees of freedom;

FIGS. 15 and 16 are schematic views of known solutions similar to those of FIG. 14 with a rotation centre of the head rotating in different positions;

Figure 1:
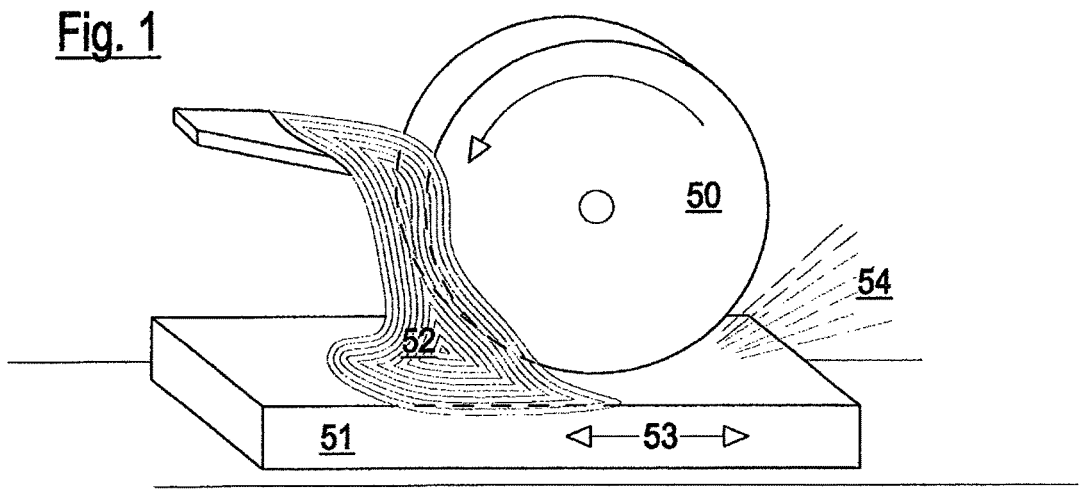
FIG. 1 is a schematic perspective view illustrating the grinding process.
Figures 2, 3:
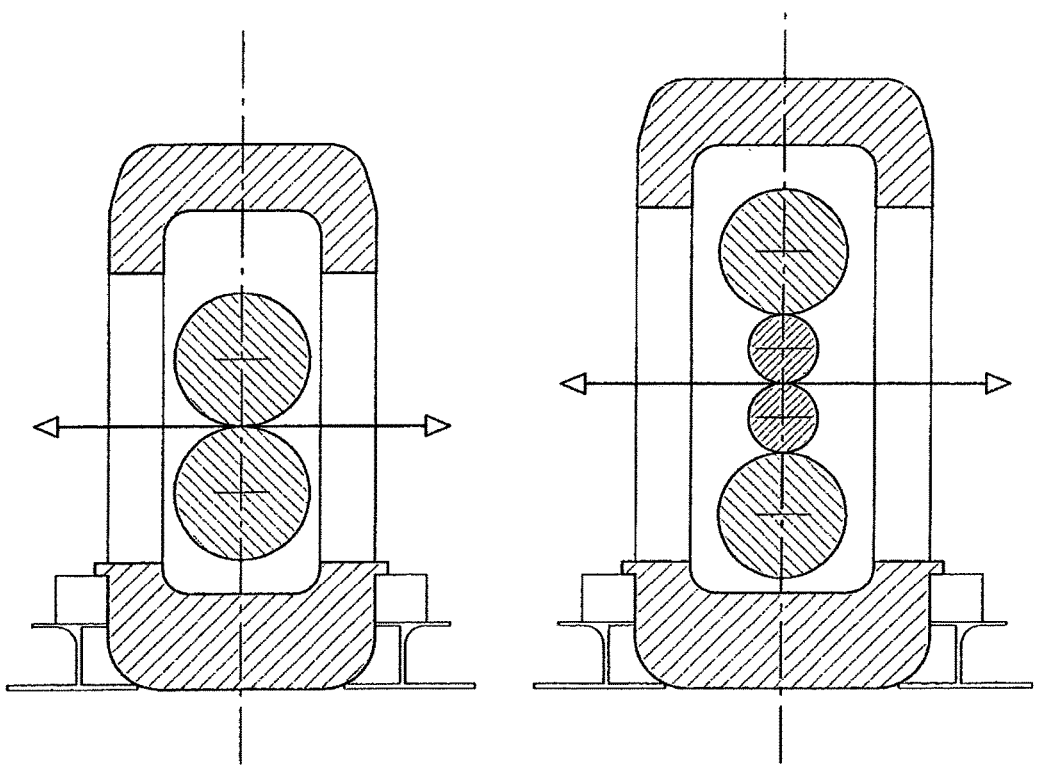
Figure 4:
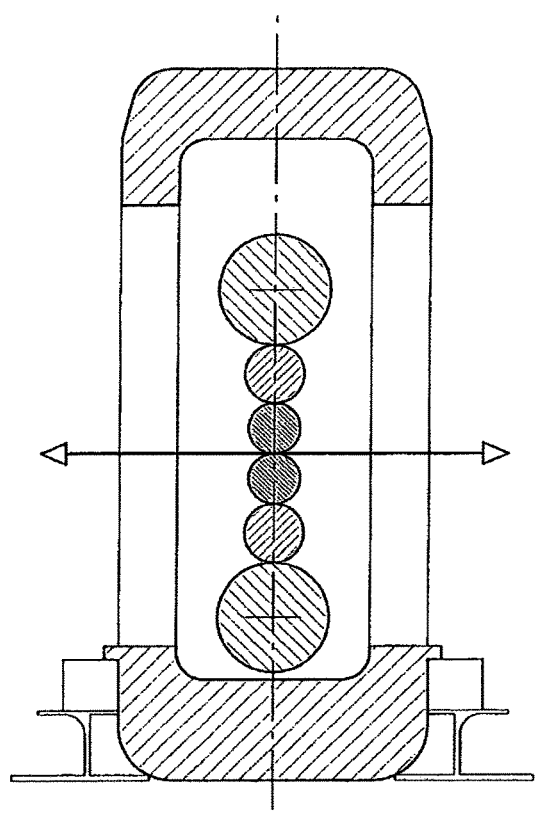
Figure 5:
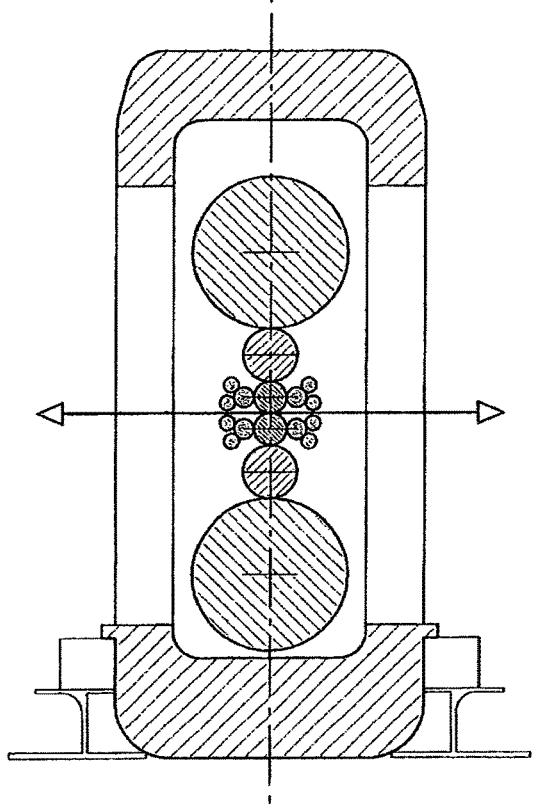
Figure 8:
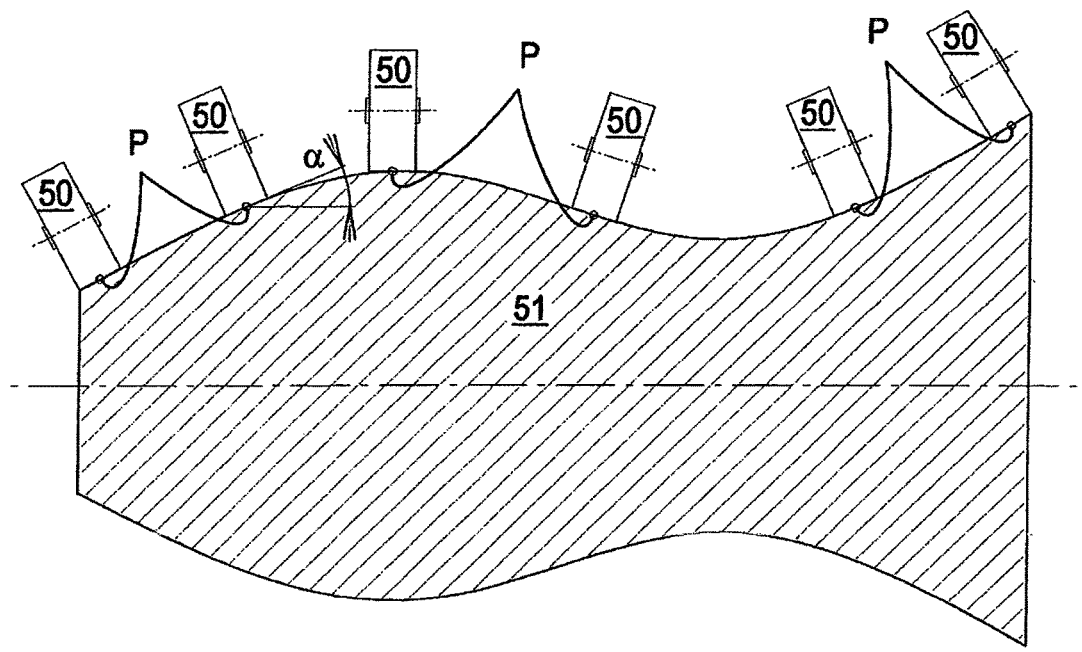
FIG. 8 shows the ideal position of a grinding wheel for the grinding of a cylinder with any non-straight profile.
Figure 9:
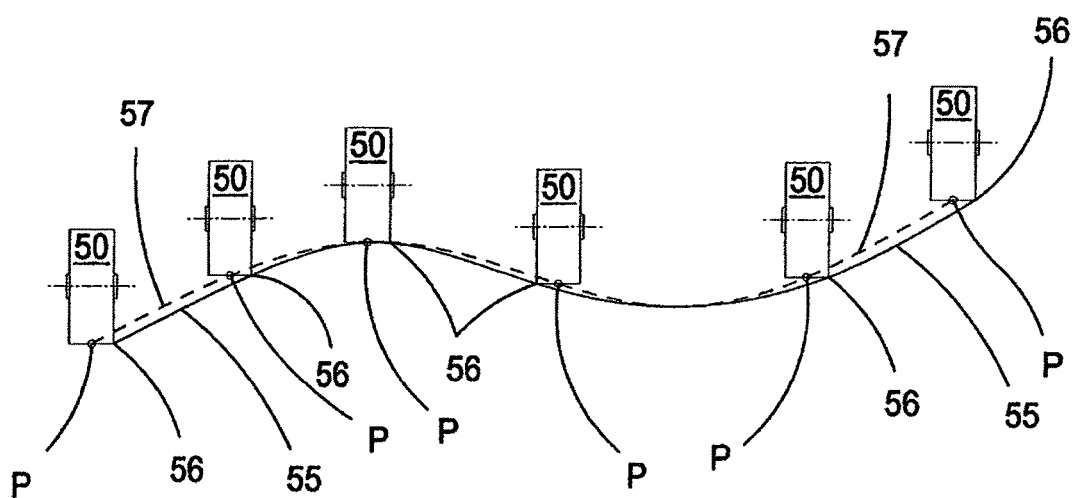
FIG. 9 shows the position of a grinding wheel which causes the gouging phenomenon during the grinding of a cylinder having any non-straight profile.
Figure 10:
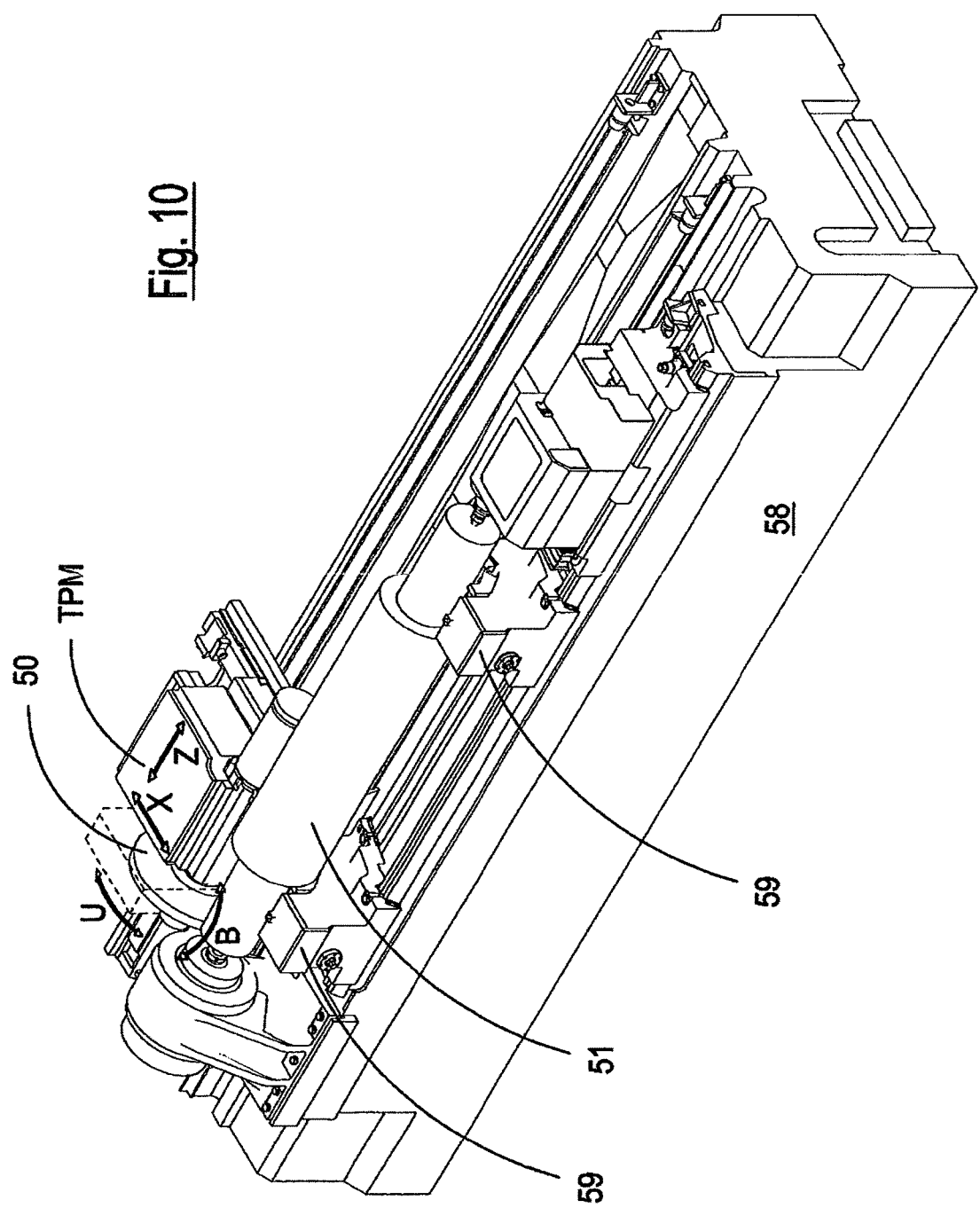
FIG. 10 is a schematic perspective view of a cylindrical peripheral grinding machine for the outside.
Figure 11:
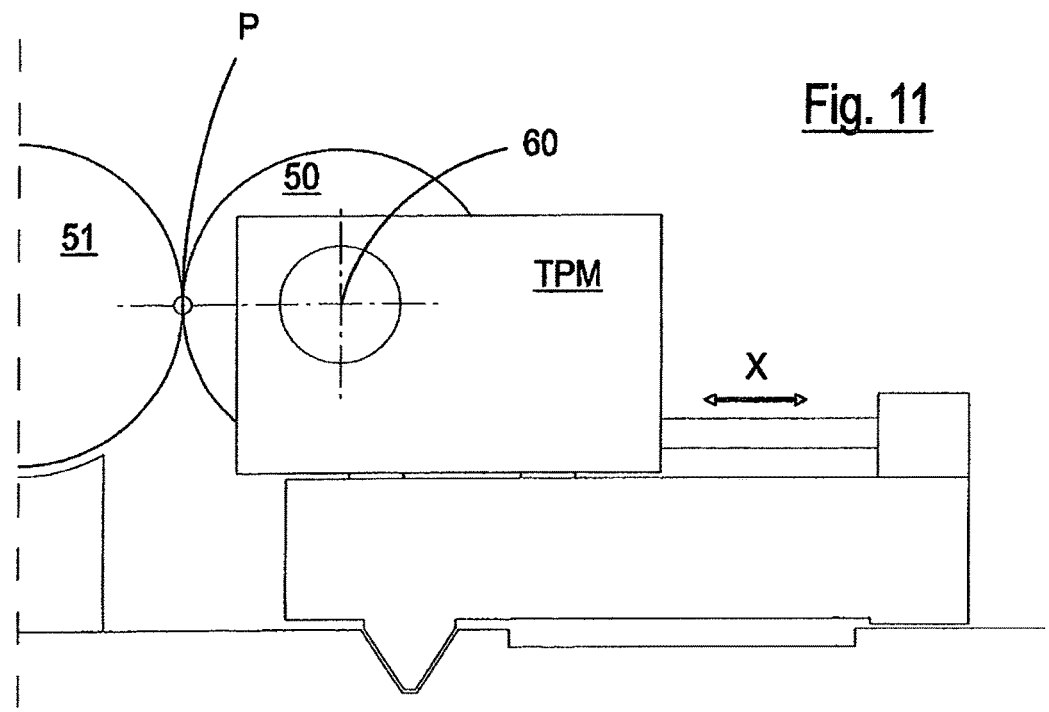
FIG. 11 is a schematic detail of a first known solution in which there is the micrometric positioning of the grinding wheel with only one axis X, i.e. with one degree of freedom.
Figure 12:
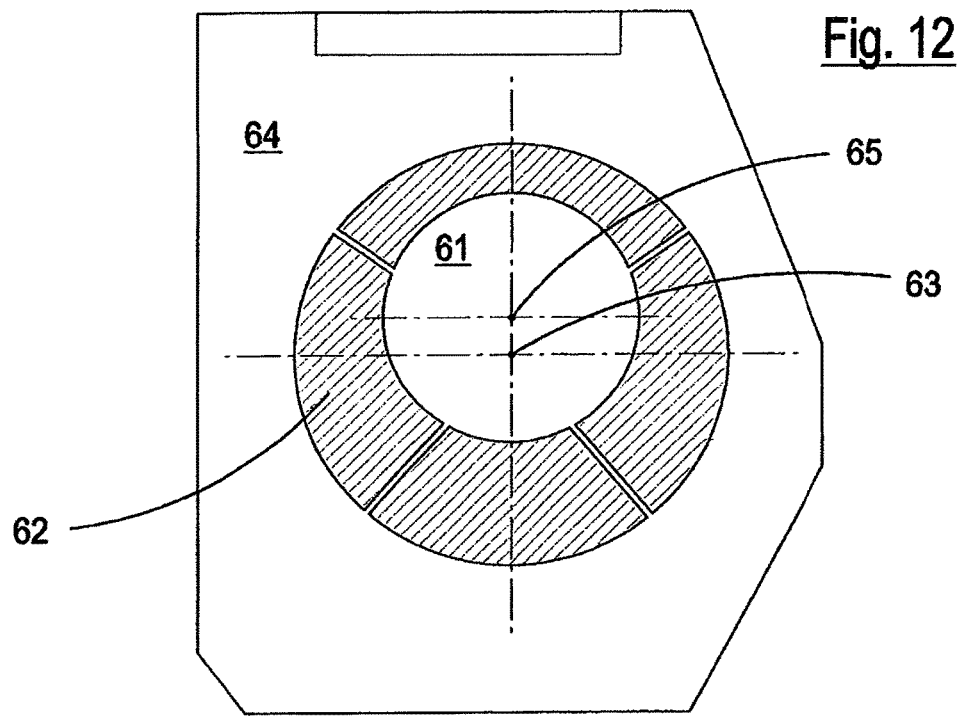
FIG. 12 is a schematic detail of another known solution in which there is the micrometric positioning of the grinding wheel with an axis X and an axis U, i.e. with two degrees of freedom.
Figure 17:
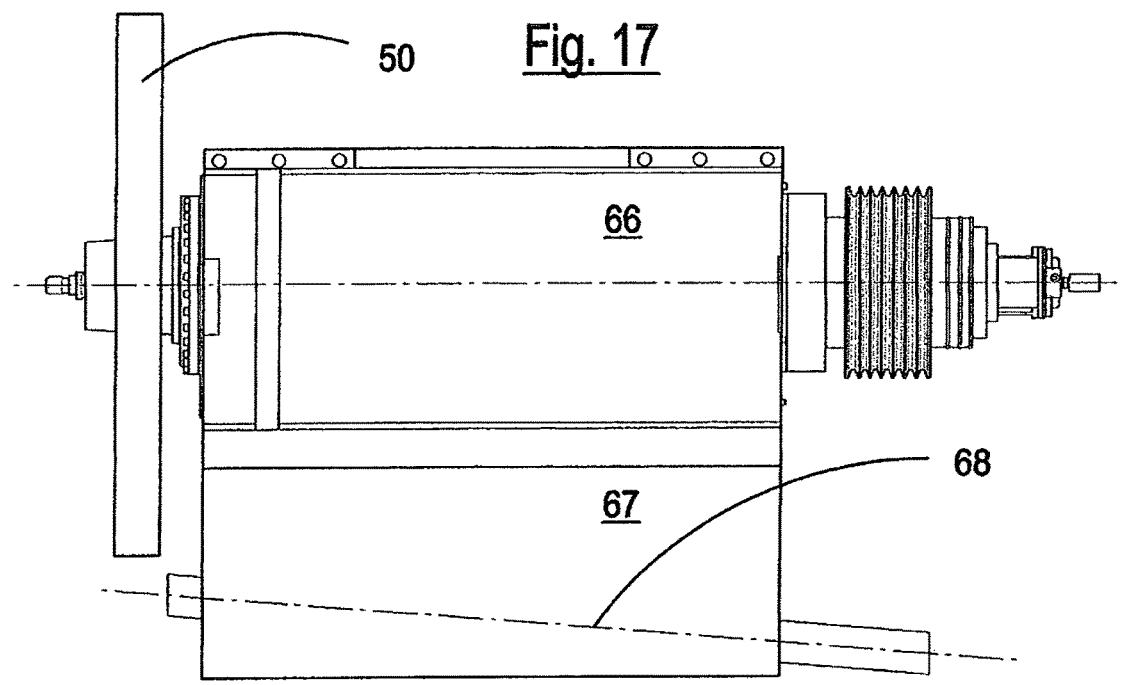
FIG. 17 shows a rotation application scheme of a wheelhead with a tilted axis in the "tilt infeed" version.
Figure 18:
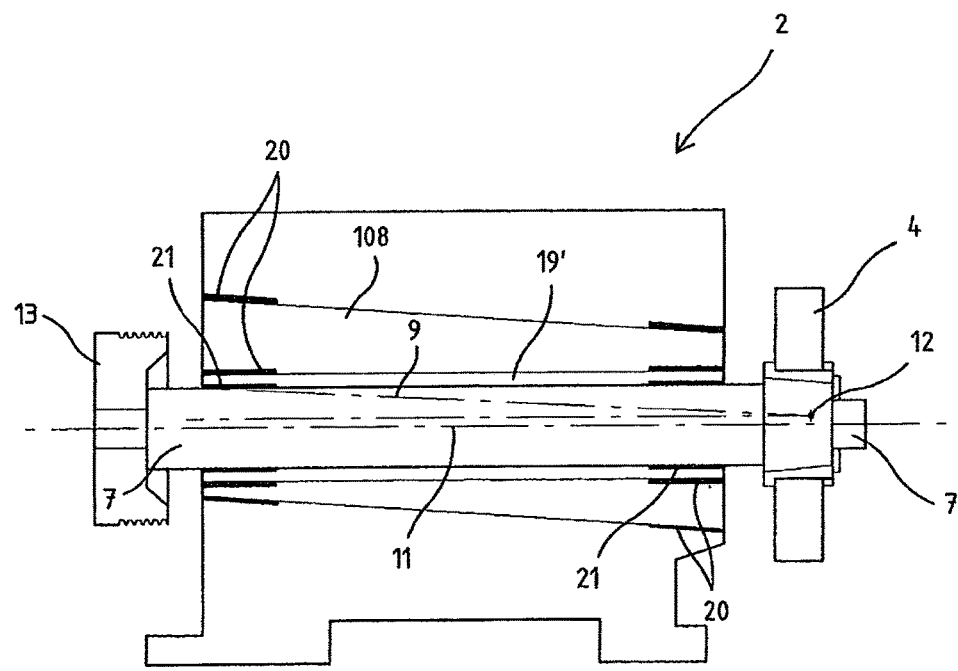
Figure 19:
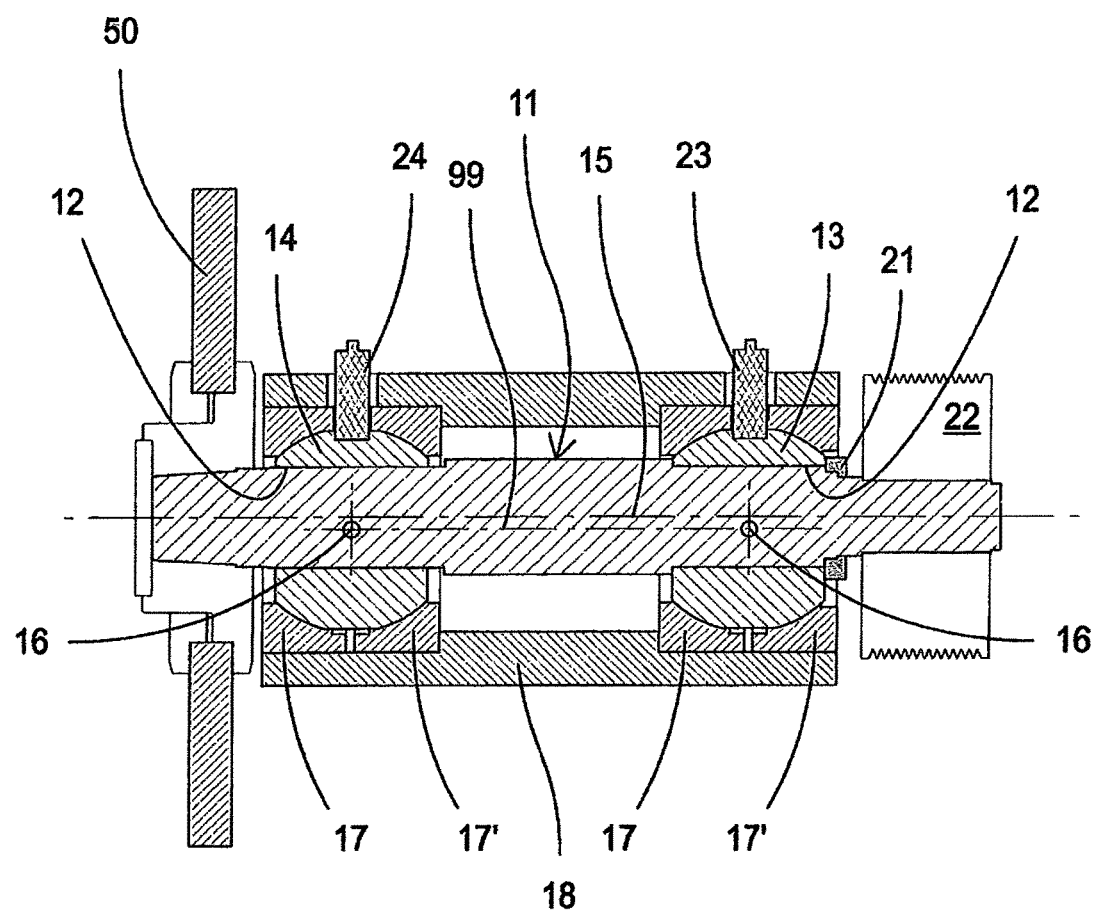
Figure 20:
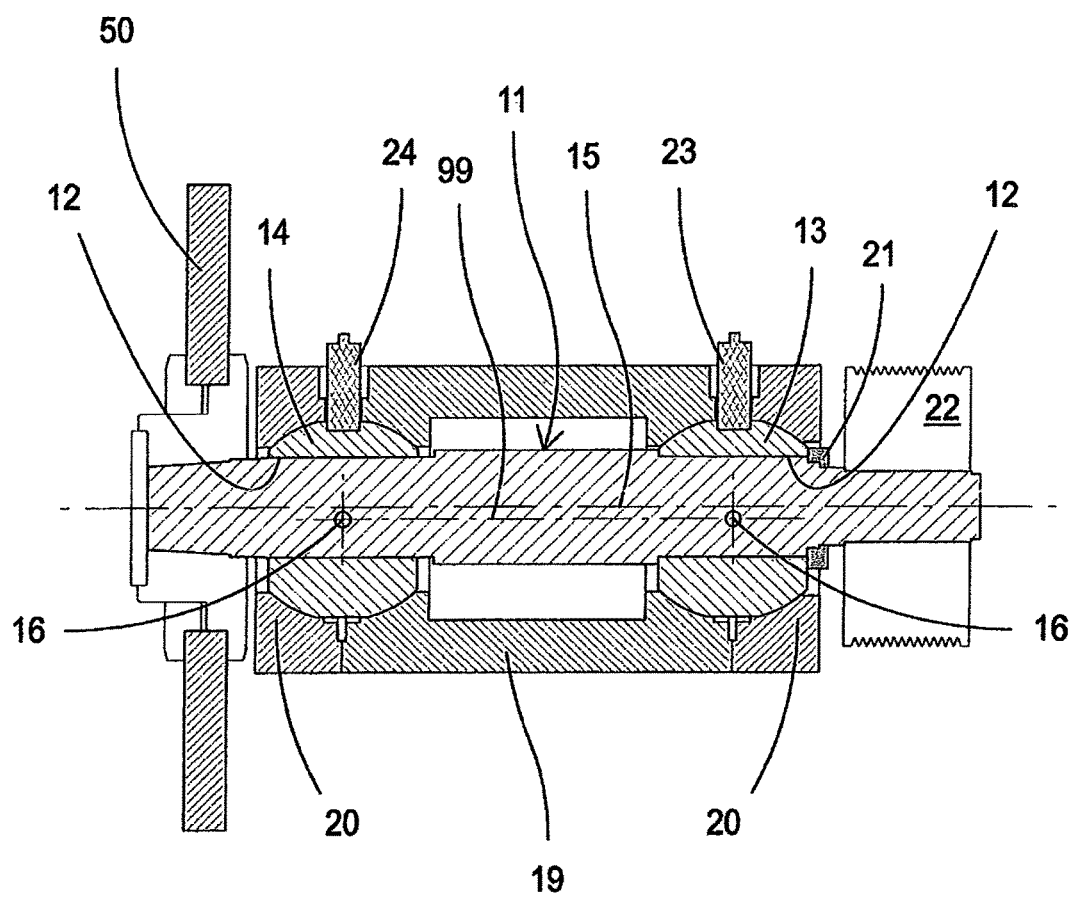
Figure 21:
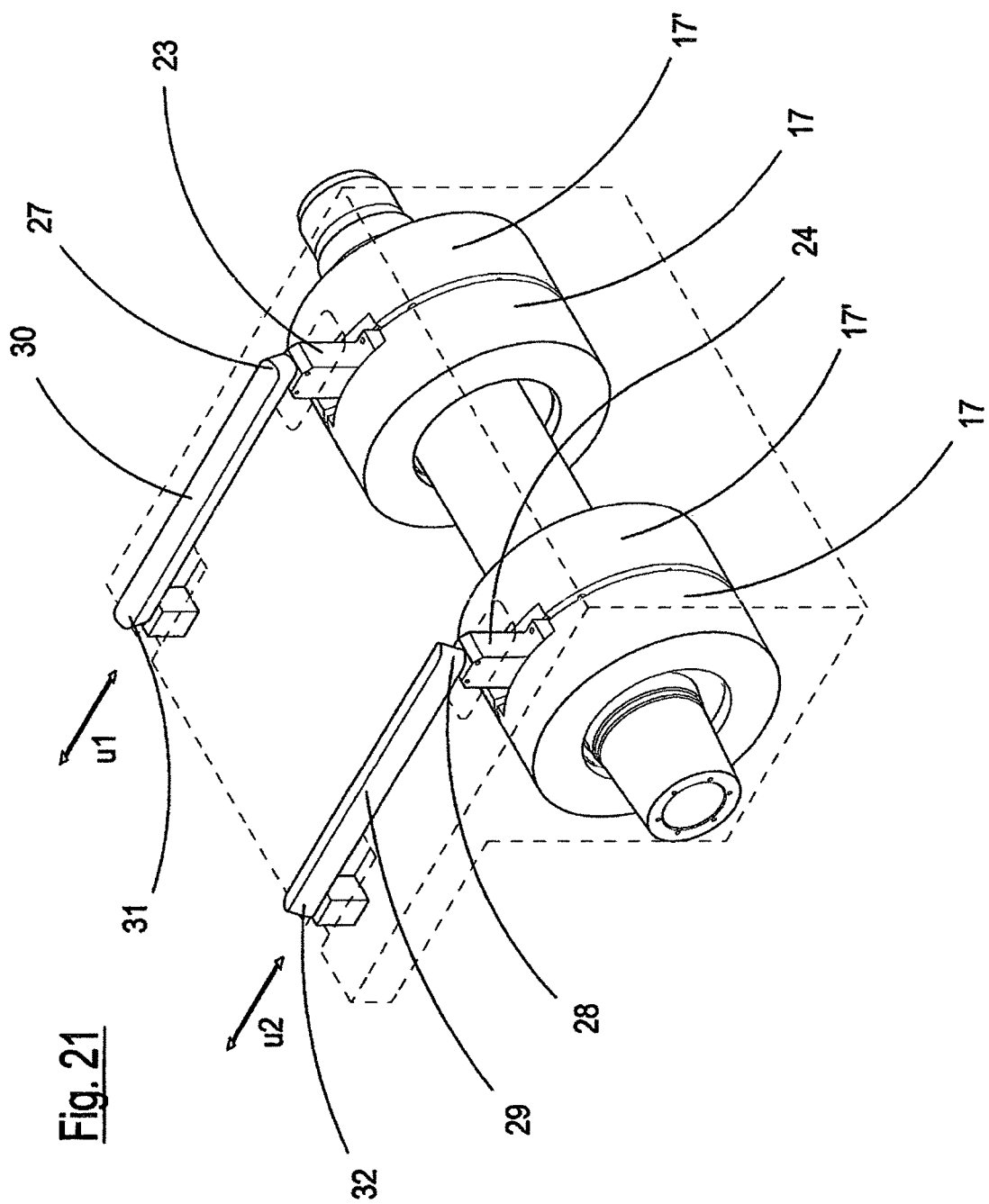
Figure 22A:
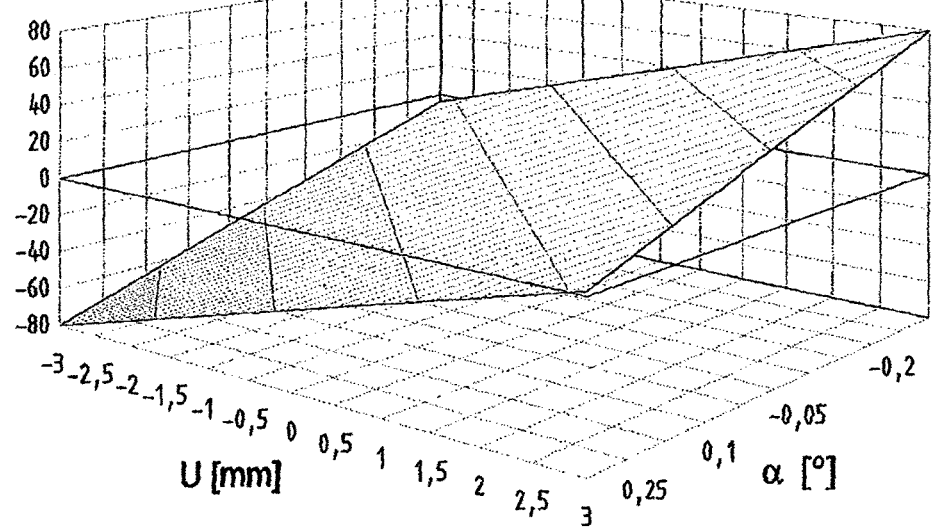
Figure 22B:
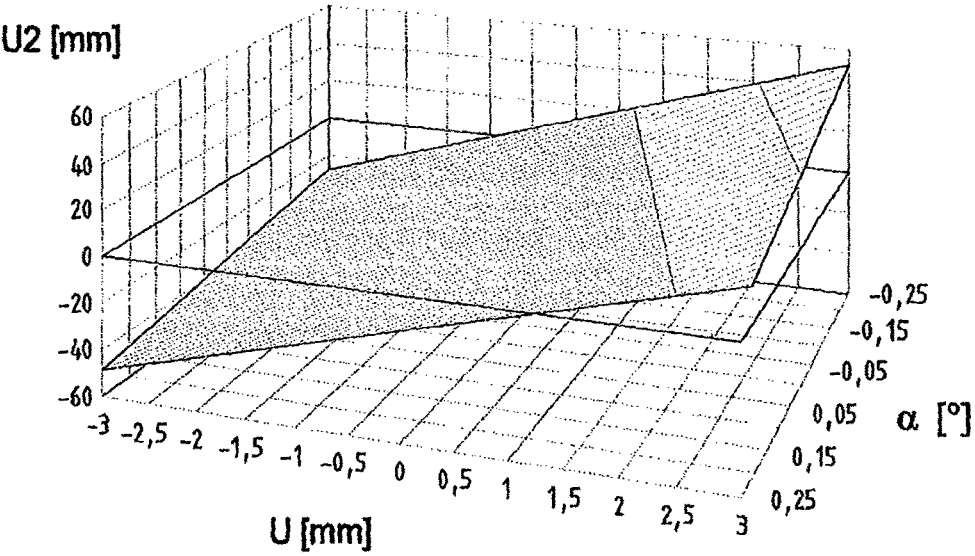
Figure 23:
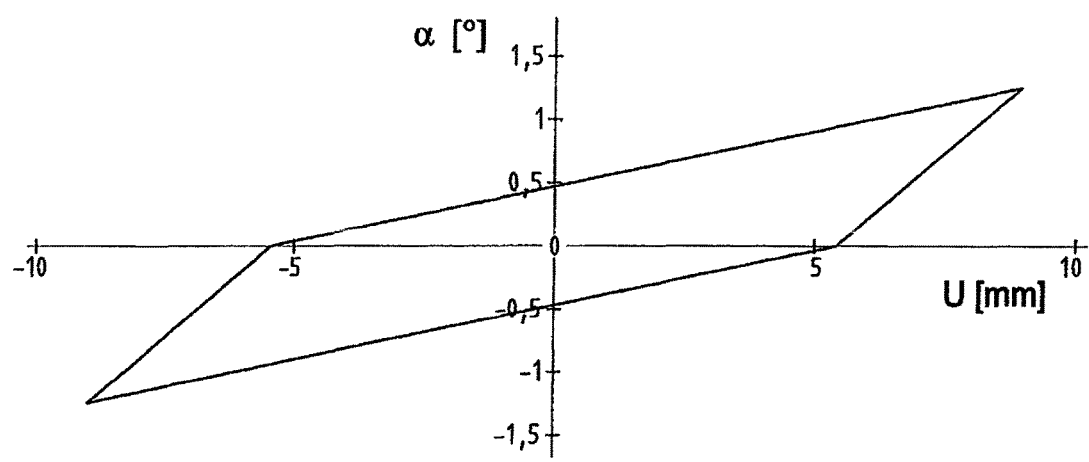
Figure 24:
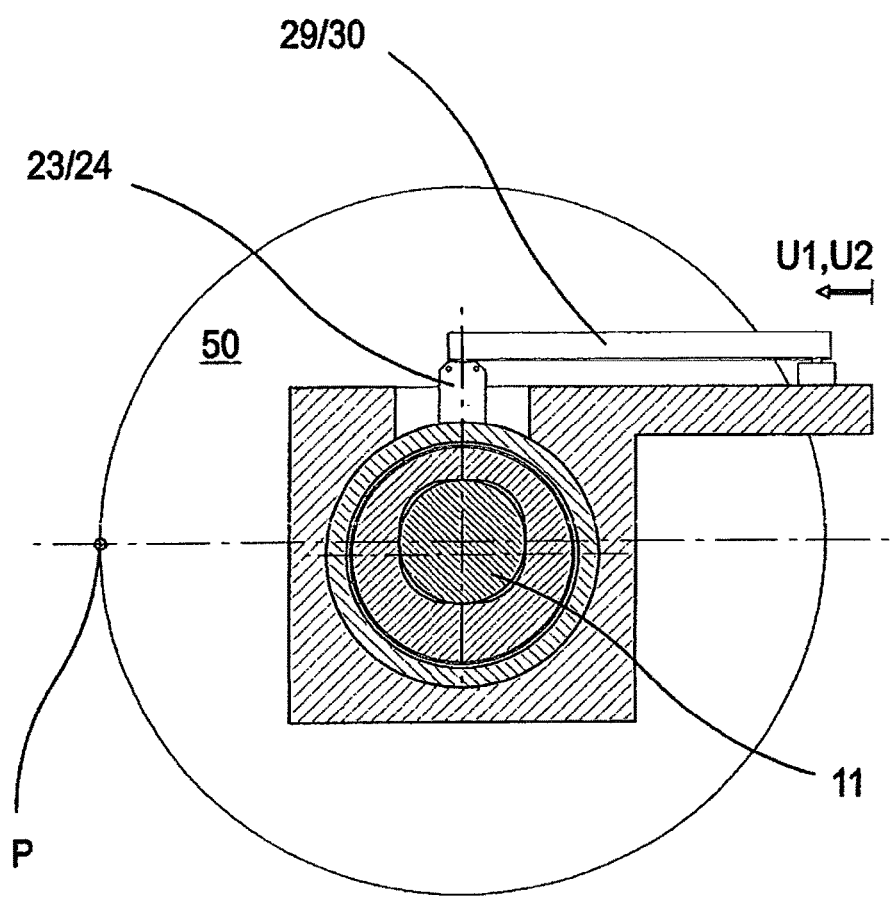
Figure 25:
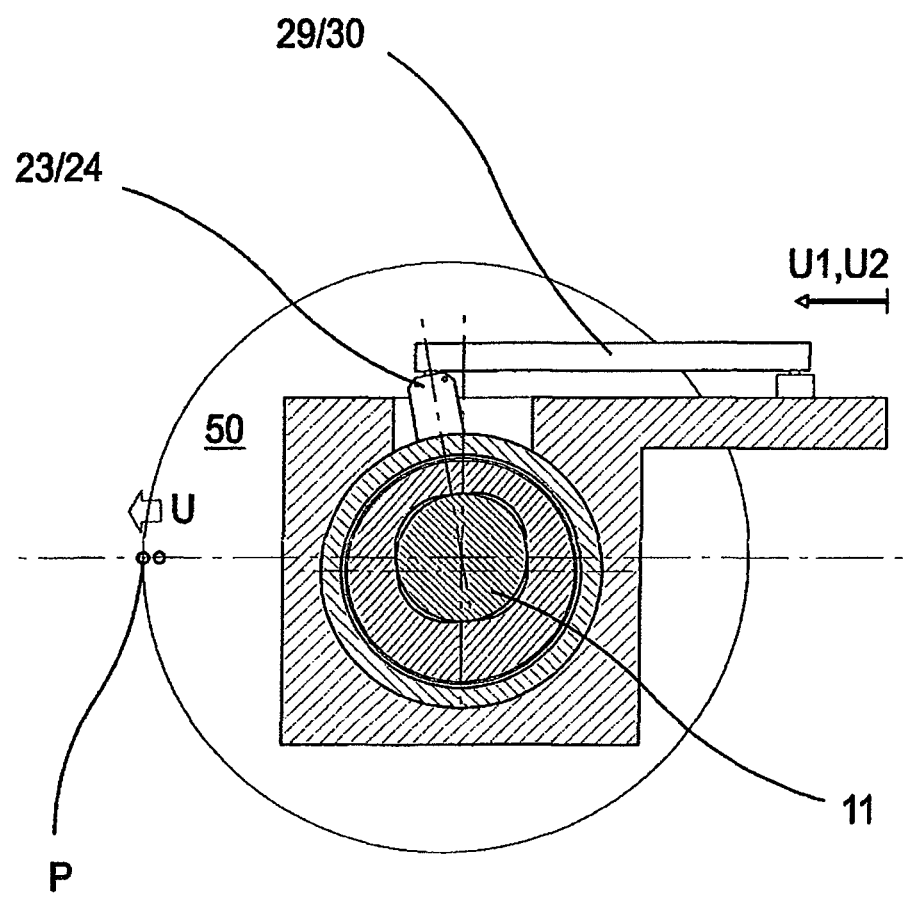
Figure 26:
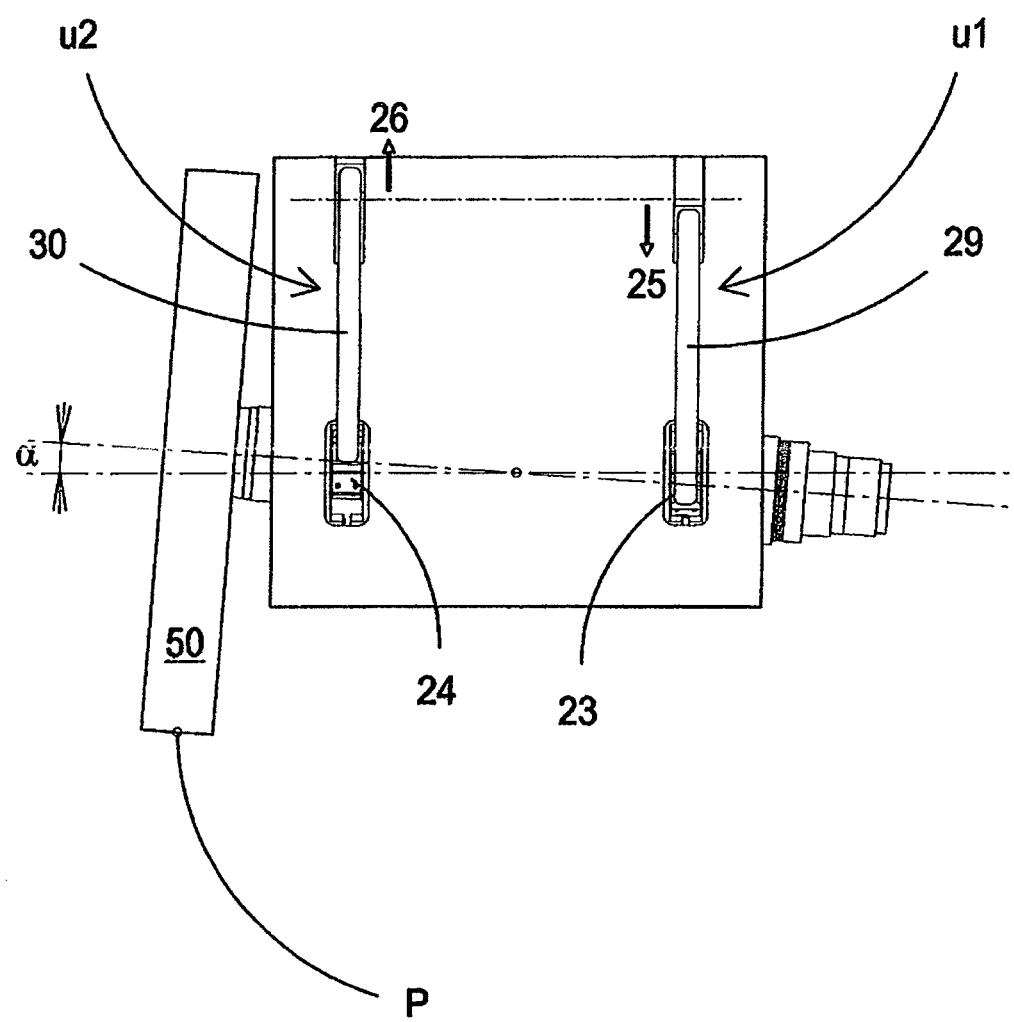
Figure 29:
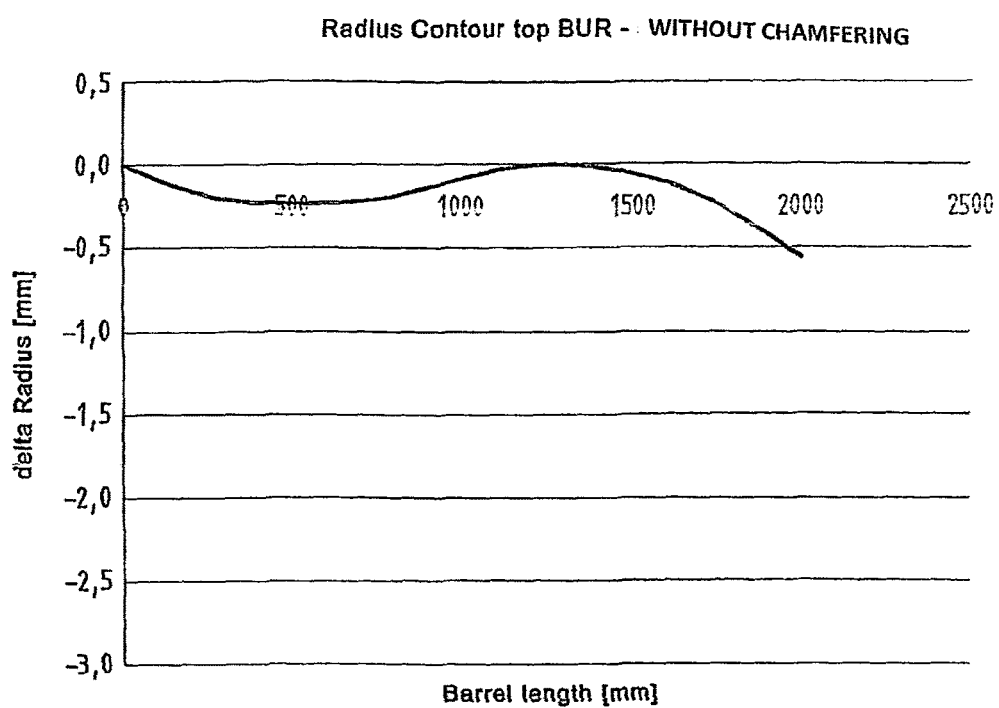
Figure 30:
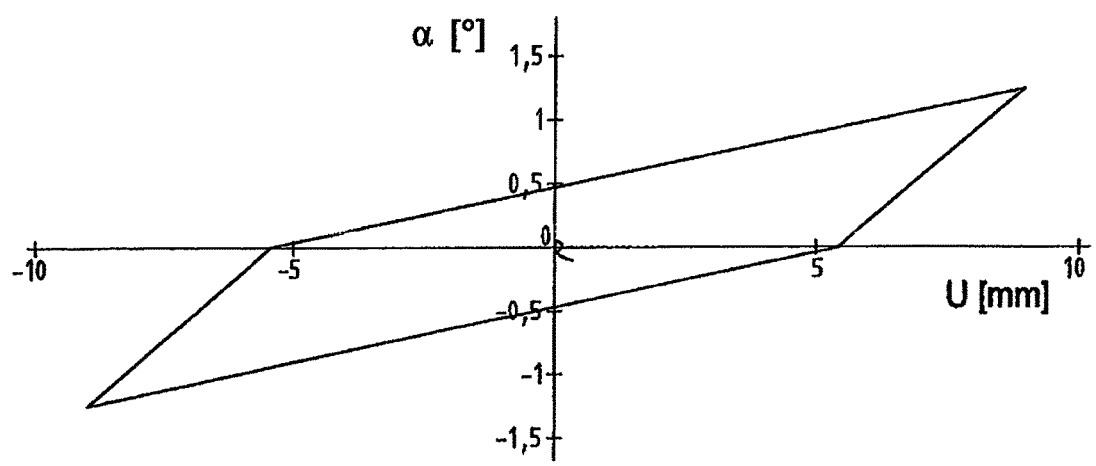

FIG. 18 shows the solution illustrated and object of U.S. Pat. No. 6,234,885 B1;

FIG. 19 illustrates a sectional view of a positioning of a spindle with a micrometric forwarding and tilting command of the axis according to the present invention in a first embodiment thereof;

FIG. 20 illustrates a sectional view of a positioning of a spindle similar to that of FIG. 19 in a second embodiment;

FIG. 21 shows an embodiment example of the movement commands of the actuation levers;

FIGS. 22a and 22b show two three-dimensional diagrams in which, in the first, the dependent variable U1 corresponding to the first actuation of the mechanism is associated with each pair of independent variables (U,α), in the second, the second dependent variable U2, corresponding to the second actuation, is associated with each pair (U,α);

FIG. 23 shows a diagram which illustrates the operating range of the kinematic mechanism, i.e. of the positioning of the spindle according to the invention. As the mechanism in question has two degrees of freedom, in order to characterize the operating range, the limits that the independent variables of the system can have, must be defined. The diagram shows, in the abscissa, the forwarding of the grinding wheel-cylinder contact point (independent variable U) and, in the ordinate, the rotation angle of the spindle axis on the horizontal plane (independent variable α); the mechanism, object of the present invention, allows all the pairs (U,α) enclosed within the segments indicated in the figure, to be obtained;

FIGS. 24 and 25 are schematic sectional views that show how the micrometric forwarding of the grinding-wheel centre P according to the present invention, is obtained;

FIG. 26 shows a schematic view from above of what is shown in FIG. 21, with particular respect to the actuation levers for obtaining the tilting of the spindle and shifting of the grinding-wheel centre;

FIGS. 27a and 27b and 28a and 28b respectively show in a view from above and in a raised side view, what is shown in FIG. 21 in different operational positions in order to illustrate the characteristics and functioning more clearly;

FIG. 29 represents a diagram which shows the forwarding required by the grinding-wheel centre P (independent variable U) for obtaining a certain profile;

FIG. 30 is the same as FIG. 23 in which, a polar diagram has been superimposed over the operating range, which represents the combination of the pairs of values (U,α) for obtaining the profile of FIG. 29. The profile of FIG. 29 can evidently be formed by the mechanism, as the polar diagram is completely contained in the area of use of the same mechanism.

With reference to FIG. 19, this illustrates an arrangement of the spindle with a micrometric forwarding and tilting command of the axis according to the present invention in one of its embodiments.

The arrangement of FIG. 19 shows a mechanism that is composed of a spindle 11, housed and rotating in cylindrical seats 12 respectively formed in the body of two spherical elements 13, 14. The two seats 12 are formed with a suitable eccentricity between an axis 15 of the spindle 11 and an axis 99 passing through the centres 16 of each of the spherical elements 13, 14. In particular, these elements 13, 14 consist of portions of spheres, in each of which the seat 12 of the spindle 11 is a pass-through and eccentric hole with respect to the centre of the spherical element.

The coupling between the spindle 11 and the spherical elements 13, 14 can be effected using the normal techniques adopted in this field, i.e. by means of hydrostatic or hydrodynamic or rolling bearings.

Each spherical element 13, 14 is, in turn, positioned in a suitable housing which, in the construction form proposed, is composed of two parts, or half-bodies 17 and 17' for allowing the assembly. Also in this case, the coupling between the spherical elements and relative seats can be easily obtained with the techniques mentioned above. The two half-bodies 17 and 17' are housed either directly in a wheelhead (TPM), or in a cartridge or shaped sleeve 18 that can be easily installed in a TPM.

This solution of FIG. 19 can obviously be alternatively modified by integrating the two internal half-bodies 17 and 17' in the body of the TPM or cartridge. In this way, composite housings 19 and 20 are obtained without modifying the concept of the invention, as shown, for example, in FIG. 20.

Furthermore, with reference to both FIGS. 19 and 20, the spindle 11 and one of the two spherical elements, for example that indicated with 13, can be processed so as to act as thrust bearings or receive a thrust bearing 21, for opposing the forces acting along the axis of the spindle.

The spindle 11 can be rotated according to the classical motor with pulley 22 scheme (as represented in FIGS. 19 and 20) or different solutions can be equally used. A motor-spindle can be used, for example (with the motor mounted directly on the spindle cantilevered with respect to the bearings and on the opposite side to the grinding wheel), or using an electro-spindle, with the motor housed between the two spherical joints (neither of these embodiments are shown).

The arrangement of the present invention is completed by two control means, in the example consisting of levers 23 and 24 which are connected, or in any case extend from the two spherical elements 13 and 14 and allow the desired rotations to be effected by the above-mentioned elements. The two control means, i.e. the two levers 23 and 24, are such as to cause an independent rotation of each of the two spherical elements 13 and 14. In an alternative embodiment, the rotation means can be torque motors or similar means.

As an embodiment but non-limiting choice, the rotation of spherical elements 13, 14 is regulated with the system represented in FIG. 21.

The levers 23, 24, integral with the spherical joints 13, 14, positioned in respective housings 17, 17', are in turn constrained, by means of two ball joints, schematized in 27, 28, to a pair of connecting rods 29, 30. This pair of connecting rods 29, 30, through a second stage of ball joints 31, 32, is activated with respective linear movement systems schematized with u1 and u2, which effect the movements defined above as dependent variables U1 and U2, of a system with two degrees of freedom.

The mechanism is in fact as such, as, as many pairs of positions of the control levers 23 and 24 univocally correspond to each pair of independent variables (U, α), and consequently pairs of the above-mentioned coordinates U1 and U2.

In order to control the variables (U, α) and allow the applicability of the present kinematic system in a tool machine, in addition to knowing its limits and possibilities of improvement, it is crucial to solve the equations that govern its physical behaviour. In this respect, the writing of non-linear equations and their solution by numerical integration, through suitable software, allows the mathematical solution of the kinematic mechanism to be obtained, by univocally linking the two independent variables (U, α) with the dependent variables (U1, U2), as shown in the diagrams of FIGS. 22a and 22b.

This type of solution allows the dimensions and geometrical characteristics of the components used to be rationally and optimally selected and also to know and define the functioning limits of the kinematic mechanism itself. If the limits of the variables U1 and U2 are set so as to allow an oscillation of the levers 23, 24 of about +/−20° with respect to its own vertical axis, a diagram of the type shown in FIG. 23 is obtained, in which the area enclosed by the segments represents the combination of the values admissible for the independent variables (U, α), compatibly with the kinematic constraints of the system itself. It should be pointed out, however, that by varying the dimensions of the components, the length of the various levers, the distance between eccentric and centre of the spherical elements, and by changing the maximum rotation angle of the spherical elements, said diagram can be regulated and adapted to the most diverse needs, extending the operating limits of the system itself.

For a clearer understanding of the functioning of the mechanism, some particularly significant situations are described hereunder. Let us begin by imagining that the grinding-wheel centre P is to be forwarded by a quantity U, according to the micrometric eccentric command principle previously described (or "Tilt Infeed" command), maintaining, however, the rotation axis of the grinding wheel parallel to the axis of the cylinder: one starts with the commands of the levers 23, 24 arranged so that the two coordinates U1 and U2 are identical, as indicated in FIG. 24. Both of these are then increased by the same amount as represented in FIG. 25, obtaining a translation of the spindle shaft 11 and a consequent forwarding of the grinding wheel-piece contact P in the direction X by a desired amount U and with a direction complying with the movement imparted to the two axes U1 and U2, effecting in fact a micrometric forwarding.

In order to subsequently also obtain, in addition to the variation U in the position of the grinding-wheel centre P along the direction X, the variation in the angle of the spindle α, one should proceed as shown in FIG. 26.

By activating, the commands u1 and u2 and, consequently rotating the control levers 23 and 24, for example according to the directions 25 and 26, independently with respect to each other (obviously within the limits of their run), not only will a variation in the position of the grinding-wheel centre P be obtained (first degree of freedom U), but also the tilting of the axis 15 of the spindle shaft 11 and consequently of the grinding wheel 50, thus obtaining the second degree of freedom α.

Figures 27A, 27B:
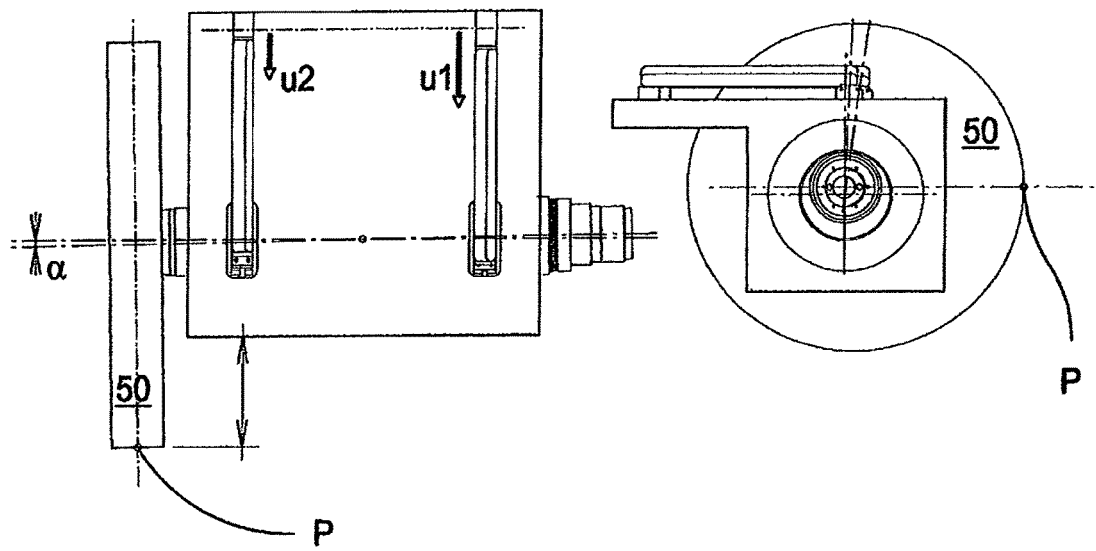
Figures 28A, 28B:
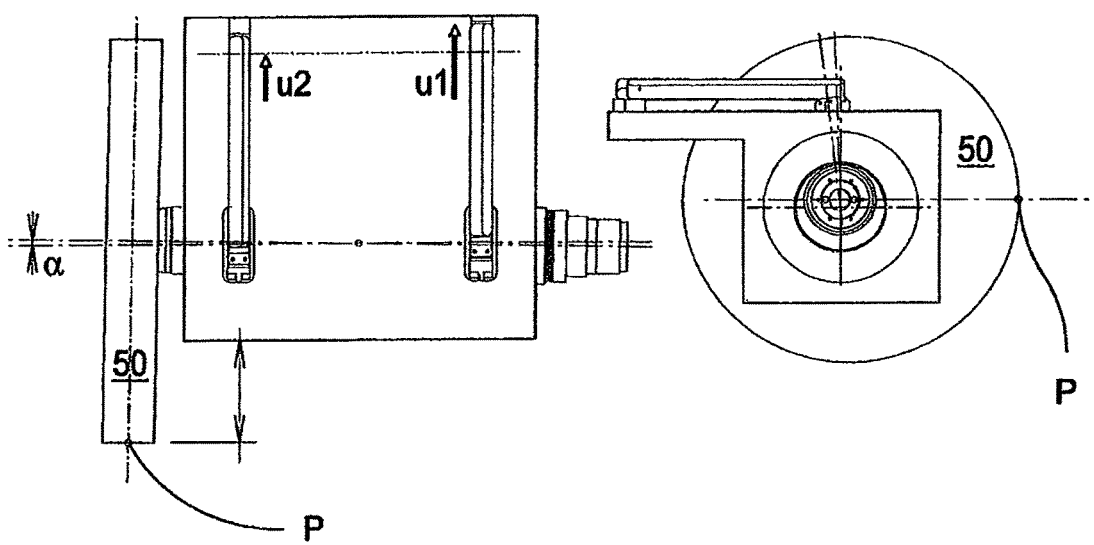

It is also possible to tilt the axis of the grinding wheel, without shifting the contact point P with respect, for example, to a starting situation analogous to that indicated in FIG. 24, by regulating the levers 23 and 24 under the conditions specified in FIGS. 27a and 27b (anticlockwise rotation) and in FIGS. 28a and 28b (clockwise rotation). In both examples, in order to obtain the desired result, U1 must be increased, except for the direction, to a greater degree with respect to U2. In order to know the exact value that the variables U1 and U2 must have, it is obviously sufficient to refer to the diagrams represented in FIGS. 22a and 22b.

In short, by combining and controlling the movements described above with suitable actuations, both the position of the grinding-wheel centre P and the tilting α of the grinding wheel itself 50 can be regulated, thus allowing the geometries of cylinders for rolling mills presented in FIG. 7 for illustrative purposes, to be obtained.

Finally, let us examine a practical case considering a common back-up roll cylinder for CRM applications. Representing in FIG. 29 the required forwarding of the grinding-wheel centre P with respect to the condition 0 (ordinate null), in relation to the position of the grinding-wheel trolley with respect to the plane of the cylinder itself, and remembering that the tangent of the grinding-wheel angle must always be equal to the derivative of the profile itself, the function (U, α) that represents this profile in polar coordinates, is represented in FIG. 30.

It can be clearly observed how the operating points of the present spindle (indicated by the central curved section) are extremely far from the kinematic limits previously defined and already shown in FIG. 23.

It will therefore be possible to obtain profiles that are much more complex than that considered herein, therefore operating with greater angles and fully satisfying market requirements, competitively from both an economic and technological point of view.

In short, the problems of the prior art have been solved through the solution proposed according to the present invention. In this respect, the following improvements can be listed with respect to the state of the art:
  the number of bearings and couplings (both axial and radial) is reduced with respect to what is proposed in U.S. Pat. No. 6,234,885 B1, improving the efficiency, the rigidity, the project simplicity and the precision of the system itself;
  the frequencies introduced by the spherical joints fall outside the range of frequencies typical of grinding processing, without, however, negatively influencing the process itself;
  it is possible to increase the tilting angles of the grinding wheel, until values higher than the present market solutions are reached, without creating, for example, problems of encumbrance typical of rotating heads;
  large reduction ratios can be selected as desired, by varying the geometry of the levers and position of the eccentric, thus allowing a facilitated control and repositioning of the system;
  it is possible to operate with the grinding-wheel centre P as rotation centre for variable grinding-wheel angle ranges in relation to the position required by the eccentric;
  a competitive solution has been obtained from both a technological and economic point of view.

An accurate mathematical modeling makes it possible to easily pass from the specific variables of the profile of the cylinder to be processed (U, α) to the control variables (U1, U2). This model allows, if necessary, the geometry of the mechanism to be re-parameterized in order to satisfy specific requirements.

The objective mentioned in the preamble of the description has therefore been achieved.

The protection scope is defined by the enclosed claims.

The invention claimed is:

1. A positioning device of a spindle with micrometric forwarding control and tilting of a rotation axis of the spindle, the device comprising:
   a spindle shaft (11) rotatingly supported inside at least two rotatable supports,
   wherein said at least two rotatable supports comprise two spherical elements (13,14) provided with respective seat surfaces to receive said spindle, said spindle being eccentric with respect to an axis (99) passing through a center of said spherical elements, said two spherical elements (13,14) being positioned in a housing having at least two parts (17,17'; or 19,20); and
   two actuators (23,24) adapted to cause the two spherical elements (13,14) to rotate,
   wherein said two actuators actuate the two spherical elements independently from one another during rotation of the spindle shaft, and
   wherein said two actuators cause a controlled rotation of the two spherical elements (13, 14).

2. The positioning device of a spindle according to claim 1, wherein each of said seat surfaces is a pass-through hole eccentric with respect to said spherical elements.

3. The positioning device of a spindle according to claim 1, wherein said housing having at least two parts (17,17'; or 19,20) is positioned in a wheel head; a cartridge; or a shaped sleeve (18) adapted to be installed on a wheel head.

4. The positioning device of a spindle according to claim 1, wherein said spindle shaft (11) is coupled to said spherical elements (13,14) with hydrostatic, hydrodynamic, rolling, or sliding bearings.

5. The positioning device of a spindle according to claim 1, where each of said spherical elements (13,14) is positioned in the housings, each of the housings having two parts (17,17'; or 19,20).

6. The positioning device of a spindle according to claim 5, wherein said two parts (17,17') of each of the housings are inserted in a spindle cartridge (18) or in a wheel head.

7. The positioning device of a spindle according to claim 1, wherein each of said housings of said two spherical elements (13,14) comprises a single central housing (19) facing sides of said spherical elements (13,14) and two end side-housings (20).

8. A positioning device of a spindle with micrometric forwarding control and tilting of a rotation axis of the spindle, the device comprising:
   a spindle shaft (11) rotatingly supported inside at least two rotatable supports,
   wherein said at least two rotatable supports comprise two spherical elements (13,14) provided with respective seat surfaces to receive said spindle, said spindle being eccentric with respect to an axis (99) passing through a center of said spherical elements, said two spherical elements (13,14) being positioned in a housing having at least two parts (17,17'; or 19,20); and
   two actuators (23,24) adapted to cause the two spherical elements (13,14) to rotate,
   wherein said two actuators actuate the two spherical elements independently from one another during rotation of the spindle shaft, and
   wherein said two actuators are two levers (23,24).

9. The positioning device of a spindle according to claim 8, wherein said two levers (23,24) are operatively coupled to two second levers (29,30) activated by respective linear movement systems (u1,u2).

10. The positioning device of a spindle according to claim 9, wherein said two levers (23,24) are operatively coupled to said second levers (29,30) by interposing two ball joints (27,28) therebetween, and wherein said second levers (29, 30) are connected to said linear movement systems (u1,u2) by interposing second ball joints (31,32).

11. The positioning device of a spindle according to claim 9, wherein said linear movement systems (u1,u2) comprise screw controls driven by electric motors.

12. The positioning device of a spindle according to claim 9, wherein said linear movement systems (u1,u2) consist of linear motors.

13. The positioning device of a spindle according to claim 1, wherein said two actuators are torque motors.

14. The positioning device of a spindle according to claim 1, wherein said spindle shaft (11) and at least one of the two spherical elements (13,14) are configured to act as a thrust or house a thrusting member (21) for opposing forces acting along an axis of the spindle.

15. The positioning device of a spindle according to claim 8, wherein said spindle shaft (11) and at least one of the two spherical elements (13,14) are configured to act as a thrust or house a thrusting member (21) for opposing forces acting along an axis of the spindle.

* * * * *